(12) United States Patent
Han et al.

(10) Patent No.: US 12,454,758 B2
(45) Date of Patent: Oct. 28, 2025

(54) METHOD OF FORMING METAL OXIDE LAYER AND METHOD OF MANUFACTURING PEROVSKITE SOLAR CELL USING THE SAME

(71) Applicant: Seoul National University R&DB foundation, Seoul (KR)

(72) Inventors: Sunghoon Han, Busan (KR); Changsoon Kim, Seoul (KR)

(73) Assignee: Seoul National University R&DB foundation, Seoul (KR)

( * ) Notice: Subject to any disclaimer, the term of this patent is extended or adjusted under 35 U.S.C. 154(b) by 83 days.

(21) Appl. No.: 18/486,119

(22) Filed: Oct. 12, 2023

(65) Prior Publication Data

US 2024/0141499 A1 May 2, 2024

(30) Foreign Application Priority Data

Nov. 2, 2022 (KR) ........................ 10-2022-0144613

(51) Int. Cl.
  C23C 18/12 (2006.01)
  H10F 10/174 (2025.01)
  H10F 71/00 (2025.01)

(52) U.S. Cl.
  CPC ...... *C23C 18/1216* (2013.01); *C23C 18/1283* (2013.01); *C23C 18/1295* (2013.01); *H10F 10/174* (2025.01); *H10F 71/1215* (2025.01); *H10F 71/138* (2025.01)

(58) Field of Classification Search
  CPC .................................................. C23C 18/1216
  See application file for complete search history.

(56) References Cited

U.S. PATENT DOCUMENTS

2022/0359824 A1* 11/2022 Ferrari ................. H10K 50/155

FOREIGN PATENT DOCUMENTS

KR    10-2022-0069082      5/2022

OTHER PUBLICATIONS

Ling et al., "Recent Progress in Engineering the Atomic and Electronic Structure of Electrocatalysts via Cation Exchange Reactions," 2020, Adv. Mater. 32, p. 201866. (Year: 2020).*
Office Action dated Jun. 26, 2024 corresponding to Korean Application No. 10-2022-0144613, 7 pages.
Sunghoon Han et al., "Indium and Tim Doping of Zinc Oxide Film by Cation Exchange and its Application to Low-Temperature Rhin-Film Transistors", Adv.Mater. Interfaces 2022, 9, 2200190.

* cited by examiner

*Primary Examiner* — Robert A Vetere

(57) ABSTRACT

Provided is a method of forming a metal oxide layer may include forming a parent metal oxide layer on the substrate structure; changing the parent metal oxide layer into a cation-exchanged metal oxide layer through a cation exchange reaction between cations in the parent metal oxide layer and cations in the reaction solution by contacting the parent metal oxide layer with a reaction solution containing these latter cations; and performing a heat treatment process on the cation-exchanged metal oxide layer.

19 Claims, 14 Drawing Sheets

< Thermal annealing >

METHOD OF FORMING METAL OXIDE LAYER AND METHOD OF MANUFACTURING PEROVSKITE SOLAR CELL USING THE SAME

CROSS-REFERENCE TO RELATED APPLICATION

This application claims priority of Korean Patent Application No. 10-2022-0144613, filed on Nov. 2, 2022, in the KIPO (Korean Intellectual Property Office), the disclosure of which is incorporated herein entirely by reference.

BACKGROUND OF THE INVENTION

Field of the Invention

The present invention relates to a method of forming a material film and a method of manufacturing a device using the same, and more particularly, to a method of forming a metal oxide layer and a method of manufacturing a perovskite solar cell using the same.

Description of the Related Art

Perovskite solar cells (PSCs) attract attention as the most promising candidate for the next-generation solar cells. Currently, single-junction PSCs exhibit the highest power-conversion efficiency among thin-film solar cells. However, while research on improving the photoelectrical properties and phase stability of perovskite is accelerating, the development of the metal oxide electron transport layer (ETL), which is deeply involved in the charge extraction efficiency and device stability, is slowly progressing.

Even the recently reported high-efficiency state-of-the-art PSCs still employ the compact titanium dioxide ($TiO_2$) and mesoporous $TiO_2$ used in early PSC studies as ETL. $TiO_2$ generally requires a high-temperature sintering process of 400° C. or higher, which limits the high-throughput fabrication of PSCs and the realization of flexible devices. In addition, $TiO_2$ has high photocatalytic activity against ultraviolet rays, which causes large hysteresis and instability in the device (i.e., PSC) upon light irradiation, and may severely limit or deteriorate long-term stability.

$SnO_2$ which has higher crystallinity, higher charge mobility, and better hole blocking ability than TiO 2 is attracting attention as the most promising ETL material for PSCs due to its processability and high resistance to UV. As the methods for producing $SnO_2$ films, thermal condensation of precursors, chemical bath deposition, atomic layer deposition, and hydrothermal synthesis may be enumerated. Among them, spin coating of water-soluble colloidal $SnO_2$ nanoparticles (np-$SnO_2$) is considered the most common method for preparing $SnO_2$ films due to its relatively low heat treatment temperature (about 150° C.) and easy process.

However, in the case of the np-$SnO_2$ spin coating method, the organic surfactant covering the surface of the nanoparticle (np) is not completely removed even through heat treatment, there is a problem that not only causes high electrical resistance in the film, but also hinders the growth of perovskite. In addition, in the case of chemical bath deposition, since the pH (power of hydrogen) of the reaction solution is about 1.5 or less, which is low enough to etch most transparent conductive oxide films and plastic films, there is a problem that usable substrates and electrodes are extremely limited. In addition, since a high process temperature of about 200° C. or more is required to form a $SnO_2$ film having improved physical properties, there are problems in that usable substrate and electrode materials are limited, manufacturing cost increases, and productivity decreases.

Therefore, in order to manufacture a high-performance perovskite solar cell PSC at a low temperature, the development of a new method capable of manufacturing a high-quality Sn oxide film at a relatively low process temperature is required.

SUMMARY OF THE INVENTION

A technological object to be achieved by the present invention is to provide a method for forming a metal oxide layer having excellent quality at a low process temperature.

In addition, a technological object to be achieved by the present invention is to provide a method of manufacturing a perovskite solar cell PSC having excellent performance by applying the method of forming the metal oxide layer described above.

The objects to be achieved by the present invention is not limited to the objects mentioned above, and other objects not mentioned will be understood by those skilled in the art from the description below.

According to one embodiment of the present invention, there is provided a method of forming a metal oxide layer comprising: forming a parent metal oxide layer on the substrate structure; changing the parent metal oxide layer into a cation-exchanged metal oxide layer through a cation exchange reaction between cations in the parent metal oxide layer and cations in the reaction solution by contacting the parent metal oxide layer with a reaction solution containing these latter cations; and performing a heat treatment process on the cation-exchanged metal oxide layer.

The parent metal oxide layer may include a first binary metal oxide.

The cation-exchanged metal oxide layer may include a second binary metal oxide different from the first binary metal oxide.

The parent metal oxide layer may include Zn oxide.

The cation exchanged metal oxide layer may include Sn oxide.

The step for forming the parent metal oxide layer may include forming a coating layer by coating an amminehydroxo zinc complex solution on the substrate structure; and performing a heat treatment process on the coating layer.

The heat treatment process for the coating layer may be performed at a temperature of about 100 to 300° C. for about 30 minutes or more.

The step for changing of the parent metal oxide layer into the cation exchanged metal oxide layer may be performed to exchange about 90% to 100% of metal cations of the parent metal oxide layer with the cations in the reaction solution.

The reaction solution may include a mixture of $SnCl_4$, ethanol and water.

The concentration of $SnCl_4$ in the reaction solution may be in the range of about 3 to 10 mM.

The cation exchange reaction may be performed by immersing the parent metal oxide layer in the reaction solution, the temperature of the reaction solution may be in the range of room temperature to 100° C., and the cation exchange reaction may be performed for about 30 seconds to 10 minutes.

The heat treatment process for the cation-exchanged metal oxide layer may be performed for about 20 minutes to 2 hours at a temperature of about 80 to 200° C.

The substrate structure may include fluorine-doped tin oxide (FTO), and the parent metal oxide layer may be formed on a surface of the FTO.

According to one embodiment of the present invention, there is provided a method of manufacturing a perovskite solar cell PSC comprising: preparing a first electrode; forming an electron transport layer ETL including a metal oxide layer which is formed by using the method of forming a metal oxide layer described above on the first electrode; forming a perovskite-based photoactive layer on the electron transport layer ETL; forming a hole transport layer HTL on the photoactive layer; and forming a second electrode on the hole transport layer HTL.

The electron transport layer ETL may include Sn oxide.

The electron transport layer ETL may have a thickness ranging from about 5 to 50 nm.

The first electrode may include fluorine-doped tin oxide FTO.

The method may further include forming a passivation layer on the perovskite-based photoactive layer, and the hole transport layer HTL may be formed on the passivation layer.

According to another embodiment of the present invention, there is provided a method of manufacturing a device comprising forming a metal oxide layer by using the method of forming a metal oxide layer described above; and forming at least one electrode structure electrically connected to the metal oxide layer.

According to embodiments of the present invention, it is possible to implement a method of forming a metal oxide layer having excellent quality at a relatively low process temperature by using a cation exchange technique. In addition, a perovskite solar cell PSC having excellent performance may be easily manufactured by applying the method of forming the metal oxide layer described above.

For example, when using the cation exchange technique according to an embodiment of the present invention, it is possible to form a Sn oxide layer ($SnO_2$ layer) having a very low oxygen vacancy ratio which is difficult to achieve by conventional $SnO_2$ film manufacturing methods, through a process of heat treatment at a low temperature of about 80 to 200° C. (e.g., about 100° C.) for about 20 minutes or more or about 30 minutes or more. In an embodiment of the present invention, the film (oxide layer) immediately after the cation exchange process may be in a state in which ionic impurities including tin hydroxide are minimized, which enables a high-quality Sn oxide layer ($SnO_2$ layer) to be formed at a significantly lower temperature than conventional manufacturing methods. Here, the existing preparation methods may be methods based on the precursors such as $SnCl_2 \cdot 2H_2O$ and $SnCl_4 \cdot 5H_2O$ or colloidal $SnO_2$ nanoparticles, which require a relatively high heat treatment temperature of more than about 150° C. or higher or about 200° C. or higher to ensure removal of impurities and thermal condensation.

In addition, the conventional manufacturing method usually deposits a $SnO_2$ film having a thickness of 30 to 50 nm to completely cover the rough surface of the lower fluorine-doped tin oxide (FTO) transparent electrode. In contrast, when the cation exchange technique according to the embodiment of the present invention is employed, it is possible to deposit a Sn oxide layer ($SnO_2$ layer) of a thickness of about 5 to 30 nm (e.g., about 10 nm) having conformal surface coverage on the FTO surface. This means that power-conversion efficiency may be improved by increasing the short-circuit current density and fill factor of PSC by extracting electrons more effectively than conventional manufacturing methods. In fact, it was confirmed that the performance and efficiency of the PSC using the Sn oxide layer ($SnO_2$ layer) deposited by the cation exchange technology as the ETL in the embodiment of the present invention is superior to the PSC to which the ETL made of colloidal $SnO_2$ nanoparticles is applied.

However, the effects of the present invention are not limited to the above effects, and may be variously extended without departing from the technological spirit and scope of the present invention.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1A:
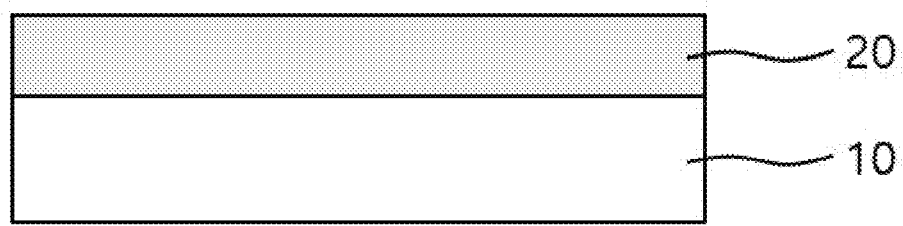
FIG. 1A to FIG. 1D are cross-sectional views illustrating a method of forming a metal oxide layer according to an embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

FIG. 1A to FIG. 1D are cross-sectional views illustrating a method of forming a metal oxide layer according to an embodiment of the present invention.

Referring to FIG. 1A, a parent metal oxide layer 20 may be formed on the substrate structure 10. The substrate structure 10 may include, for example, a predetermined substrate (a lower substrate) and a transparent conductive oxide (TCO) formed on a surface of the substrate. The substrate may be, for example, a transparent substrate such as a glass substrate. The transparent conductive oxide may be, for example, fluorine-doped tin oxide (FTO) or indium-doped tin oxide (ITO). The FTO and ITO may be examples of transparent electrode materials. When the FTO transparent electrode material is used, a parent metal oxide layer 20 may be formed on the surface of the FTO. The specific configuration of the above-described substrate structure 10 is only an example, and the structure and constituent materials of the substrate structure 10 may be variously changed.

The parent metal oxide layer 20 may include, for example, a first binary metal oxide or be composed of the first binary metal oxide. The parent metal oxide layer 20 may be a compound of a metal having an oxidation state of +2 and oxygen. As a specific example, the parent metal oxide layer 20 may include Zn oxide (ZnO) or may be a Zn oxide layer. The terms, 'ZnO' or 'ZnO layer' used herein may be broadly interpreted as encompassing not only ZnO but also $ZnO_{1-x}$. Here, x may satisfy the condition $0 \leq x \leq 1$.

When the parent metal oxide layer 20 includes Zn oxide (ZnO) or is a Zn oxide layer, a coating layer is formed by coating a ZnO precursor solution on the substrate structure 10, and then a heat treatment process is performed on the coating layer, so that the parent metal oxide layer 20 may be formed. The ZnO precursor solution may be preferably an ammine-hydroxo zinc complex solution. The ammine-hydroxo zinc complex solution may have a characteristic that crystallization may be easily realized at low temperature. The ammine-hydroxo zinc complex solution may be a $Zn(NH_3)_x(OH)_y$ solution. Here, x may satisfy the condition $1 \leq x \leq 4$, and y may satisfy the condition $1 \leq y \leq 2$. Since the thermal energy required for dissociation of zinc-ammine and condensation of zinc hydroxide is low, it is possible to form a ZnO layer with excellent electrical properties at a lower temperature (about 100 to 250° C. or 100 to 300° C.) as compared to other solution processes. The coating may be, for example, spin coating, but the coating method may be variously changed.

The heat treatment process for the coating layer, for example, may be performed at a temperature of about 100 to 300° C. for about 30 minutes or more. The time of the heat treatment process may be about 30 minutes to several hours (e.g., within 5 hours). As a specific example, the heat treatment process for the coating layer may be performed in air at a temperature of about 250° C. for about 1 hour. The coating layer may be crystallized by this heat treatment process, and thus, the parent metal oxide layer 20 having a crystalline structure may be formed. The heat treatment process described above may lead to thermal condensation. The parent metal oxide layer 20 may have a polycrystalline structure. The parent metal oxide layer 20 formed through this process may have improved crystallinity and fewer defects compared to ZnO films subject to similar heat treatment processes using other precursors such as zinc acetate, zinc nitrate, and zinc halide. As the crystallinity of the parent metal oxide layer 20 is getting higher and the number of defects is becoming smaller, the number of defects in the metal oxide layer (25' in FIG. 1D) formed therefrom may be lower. When the ammine-hydroxo zinc complex solution is used as a precursor, the parent metal oxide layer 20 having excellent crystallinity may be formed through a relatively low-temperature heat treatment process. If a method of heat treatment at a high temperature for a long time is required when forming the parent metal oxide layer 20, a problem such as limiting the selection and throughput of a flexible substrate and the underlying semiconductor or transparent electrode material occurs. However, embodiments of the present invention may overcome this problem.

A specific method of forming the parent metal oxide layer 20 is not limited to the above and may be changed according to circumstances. For example, it may be possible to form the parent metal oxide layer 20 by another method such as sputtering using a target instead of a coating method using a precursor solution. In addition, the material of the parent metal oxide layer 20 is not limited to Zn oxide and may be changed to other metal oxides such as Cu oxide (CuO).

Figure 1B:
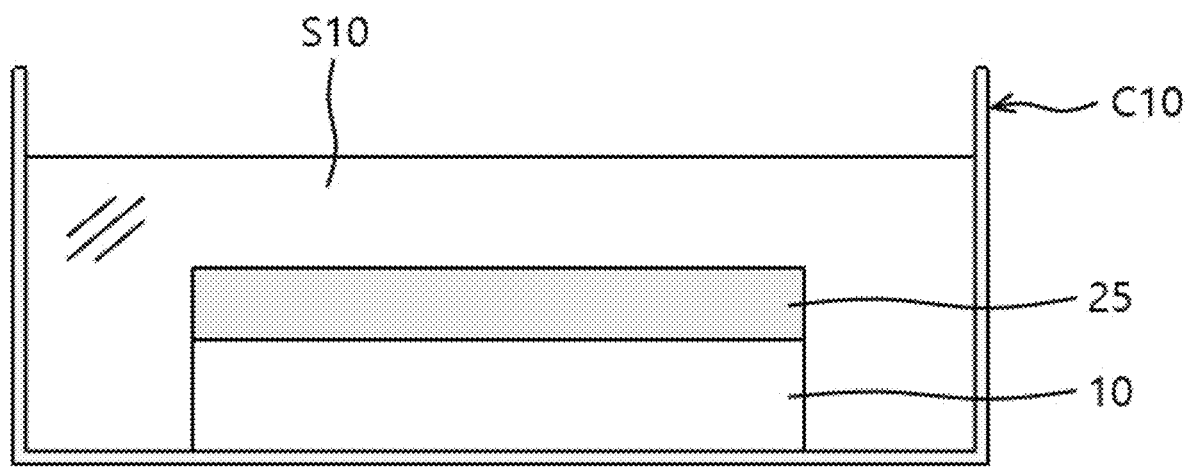

Referring to FIG. 1B, the parent metal oxide layer (20 in FIG. 1A) may be brought into contact with a reaction solution (S10) containing cations, and may be changed into a cation-exchanged metal oxide layer 25 through a cation exchange reaction between the parent metal oxide layer 20 and the reaction solution (S10). For example, the cation exchange reaction may be induced and the cation-exchanged metal oxide layer 25 may be formed by immersing the substrate structure 10 on which the parent metal oxide layer 20 is formed in the reaction solution S10 contained in the container C10.

The reaction solution S10 may include cations (metal cations). Here, the binding energy between the cation in the reaction solution and the oxygen anion constituting the parent metal oxide layer 20 may be higher than the binding energy between the cation of the parent metal oxide layer 20 and the oxygen anion of the parent metal oxide layer 20. In addition, the difference in chemical hardness between the cation in the reaction solution and the oxygen anion constituting the parent metal oxide layer 20 may be smaller than the difference in chemical hardness between the cation of the parent metal oxide layer 20 and oxygen anion of the parent metal oxide layer 20. In addition, the difference in chemical hardness between the cation constituting the parent metal oxide layer 20 and the solvent in the reaction solution S10 may be smaller than the difference in chemical hardness between the cation constituting the cation-exchanged metal oxide layer 25 and the solvent in the reaction solution S10. A cation that satisfies these conditions may be applied to the cation exchange reaction. The cation may be, for example, $Sn^{4+}$. A solvent that satisfies these conditions may be applied to the cation exchange reaction. The solvent may be, for example, ethanol and water.

The cation-exchanged metal oxide layer 25 may include or consist of a second binary metal oxide different from the first binary metal oxide described above. As a specific example, the cation-exchanged metal oxide layer 25 may include Sn oxide or be a Sn oxide layer. Here, the Sn oxide may be $SnO_2$ or $SnO_{2-x}$. The terms, '$SnO_2$' or '$SnO_2$ layer' used herein may be broadly interpreted as encompassing not only $SnO_2$ but also $SnO_{2-x}$. Here, x may satisfy the condition $0 \leq x < 2$.

Based on the case where the parent metal oxide layer 20 includes Zn oxide or is a Zn oxide layer and the cation-exchanged metal oxide layer 25 includes Sn oxide or is a Sn oxide layer, the process of the cation exchange reaction is explained as follows. Here, the reaction solution S10 includes $Sn^{4+}$ as the cation. When the parent metal oxide layer 20 is immersed into the reaction solution S10, the bond between Zn and O constituting the parent metal oxide layer 20 is weakened and Zn may be dissociated from the parent metal oxide layer 20. In addition, oxygen (O) atoms of the parent metal oxide layer 20 may be combined with $Sn^{4+}$ cations having a relatively high binding energy. An exchange reaction may occur between a $Zn^{2+}$ cation having a relatively low binding energy for an oxygen (O) atom and a $Sn^{4+}$ cation having a relatively high binding energy. Accordingly, the parent metal oxide layer 20 may be changed into a cation-exchanged $SnO_2$ layer 25.

The cation exchange reaction may be effectively performed by appropriately adjusting the composition, concentration, temperature, and reaction time of the reaction solution S10. The conditions for forming the reaction solution S10 may include the polarity or type of the solvent applied to the reaction solution S10. As a specific example, the reaction solution S10 may include a mixture of $SnCl_4$, ethanol and water. Here, $SnCl_4$ is tin(IV) chloride, which may be dissociated into $Sn^{4+}$ and $Cl^-$ in the reaction solution S10. The concentration of $SnCl_4$ in the reaction solution (S10) may be about 3 to 10 mM. In addition, the content of the water in the total amount of the ethanol and the water contained in the reaction solution S10 may be about 1 to 10 vol %. In addition, the cation exchange reaction is carried out by immersing the parent metal oxide layer 20 in the reaction solution S10, the temperature of the reaction solution S10 may be in the range of room temperature to 100° C., and the cation exchange reaction may be performed for 30 seconds to 10 minutes. When at least one of the above conditions of the reaction solution S10 is satisfied, the above-described cation exchange reaction may be effectively/efficiently performed.

According to an embodiment of the present invention, the step for transforming the parent metal oxide layer 20 into a cation exchanged metal oxide layer 25 may be performed so that 90% to 100% of the metal atoms of the parent metal oxide layer 20 may be exchanged for the cations. For example, all of the Zn atoms (or almost all of the Zn atoms) of the parent metal oxide layer 20 may be exchanged for Sn atoms. In the case of Zn oxide, since the perovskite-based photoactive layer may be decomposed by causing an acid-base reaction with the perovskite-based photoactive layer, it may be desirable that all Zn atoms (or almost all Zn atoms) of the parent metal oxide layer 20 are converted into Sn atoms. Accordingly, the cation exchanged metal oxide layer 25 thus formed may be a Sn oxide layer or a layer composed almost entirely (e.g., 90% or more or 95% or more) of Sn oxide. According to an embodiment of the present invention, these characteristics may be easily achieved by appropriately selecting/adjusting conditions such as composition, concentration, temperature, and reaction time of the reaction solution S10.

Additionally, in order for the cation exchange reaction to occur effectively, it may be preferable that the thickness of the parent metal oxide layer 20 is on the order of several nm to several hundred nm. When the thickness of the parent metal oxide layer 20 is excessively thick, it may not be easy for the cation exchange reaction to occur in the entire parent metal oxide layer 20. As a non-limiting example, the parent metal oxide layer 20 may have a thickness of about 1 nm to about 900 nm.

Figure 1C:
Figure 1D:

Referring to FIG. 1C and FIG. 1D, after the cation-exchanged metal oxide layer 25 is taken out of the container (C10 in FIG. 1B), a heat treatment process may be performed on the cation-exchanged metal oxide layer 25. FIG. 1D shows the metal oxide layer 25' for which the heat treatment process has been completed. The thermally treated metal oxide layer 25' may also be referred to as a cation-exchanged metal oxide layer. The cation-exchanged metal oxide layer 25 may be dried by the heat treatment process, and the bonds between the metal atoms and the oxygen atoms in the cation-exchanged metal oxide layer 25 may be reinforced. The heat treatment process for the cation-exchanged metal oxide layer 25 may be performed at a temperature of about 80 to 200° C. for about 20 minutes to 2 hours. As a specific example, the heat treatment process may be performed for about 30 minutes at a temperature of about 100° C.

According to an embodiment of the present invention, even if a heat treatment process is performed at a relatively low temperature for a short time, the metal oxide layer 25' having excellent physical properties may be obtained. The heat-treated metal oxide layer 25' may have an amorphous phase. Alternatively, the heat-treated metal oxide layer 25' may have a part of a crystalline phase together with an amorphous phase.

According to one example, the heat-treated metal oxide layer 25' may include or may be a Sn oxide layer. If the cation exchange technology according to an embodiment of the present invention is used, it is possible to form a Sn oxide layer ($SnO_2$ layer) having a very low oxygen vacancy ratio, which is difficult to achieve by conventional $SnO_2$ film manufacturing methods through a process of heat treatment at a low temperature of about 80 to 200° C. (e.g., about 100° C.) for about 20 minutes or more or about 30 minutes or more. In an embodiment of the present invention, the film (oxide layer) immediately after the cation exchange process may be in a state in which ionic impurities including tin hydroxide are minimized, which enables a high-quality Sn oxide layer ($SnO_2$ layer) to be formed at a significantly lower temperature than conventional manufacturing methods. Here, the conventional manufacturing methods may be the methods based on precursors such as $SnCl_2 \cdot 2H_2O$ and $SnCl_4 \cdot 5H_2O$ or colloidal $SnO_2$ nanoparticles, and require a relatively high heat treatment temperature of more than about 150° C. or about 200° C. to ensure removal of impurities and thermal condensation. In addition, in order to reduce defects such as oxygen vacancy in a general way, a high-temperature heat treatment process of about 300 to 400° C. may be required. However, according to an embodiment of the present invention, it is possible to easily form a metal oxide layer 25' of excellent quality even through a low-temperature heat treatment process by using a cation exchange technique.

When the metal oxide layer 25' formed according to an embodiment of the present invention includes Sn oxide or is a Sn oxide layer, the metal oxide layer 25' may be used as an electron transport layer ETL of a perovskite solar cell PSC. In the case of the conventional manufacturing method, a $SnO_2$ film with a thickness of 30 to 50 nm is usually deposited to completely cover the rough surface of the underlying fluorine-doped tin oxide (FTO) transparent electrode. On the other hand, when the cation exchange technique according to the embodiment of the present invention is used, a Sn oxide layer ($SnO_2$ layer) having a conformal surface coverage on the FTO surface and a thickness of about 5 to 30 nm (e.g., about 10 nm) may be deposited. This means that the power-conversion efficiency may be improved by increasing the short-circuit current density and fill factor of the perovskite solar cell (PSC) by extracting electrons more effectively than conventional manufacturing methods. Therefore, it is possible to implement a perovskite solar cell PSC having excellent performance by applying the method according to the embodiment of the present invention. However, the thickness of the metal oxide layer 25' is not limited to the range of 5 to 30 nm, and may have a thickness of 5 nm or less or 30 nm or more in some cases. For example, the thickness of the electron transport layer ETL composed of the metal oxide layer 25' may be in the range of about 5 to 50 nm. In addition, an appropriate thickness range of the metal oxide layer 25' may vary depending on the applications.

In addition, Sn oxide has excellent charge mobility, light transmittance, atmospheric stability, and mechanical flexibility, and thus may be applied to various electronic and optoelectronic devices. In particular, since Sn oxide may be applied not only to perovskite solar cells (PSC) but also to next-generation electronic and optoelectronic devices such as flexible displays, thin film transistors, memories and sensors, the Sn oxide film manufactured according to an embodiment of the present invention may be used in various device fields.

In addition, unlike conventional methods (thermal condensation, chemical bath deposition, atomic layer deposition, hydrothermal synthesis, and spin coating of $SnO_2$ nanoparticles), the method according to an embodiment of the present invention have advantages that it does not require high-temperature heat treatment and can be processed in a reaction solution that is not strongly acidic. Therefore, the method according to the embodiment of the present invention may expand the range of selection of usable substrates and electrode materials, and may have excellent competitiveness in terms of manufacturing cost and throughput.

Additionally, in the foregoing embodiment, the case where the reaction solution S10 contains $Sn^{4+}$ cations and the cation-exchanged metal oxide layer 25 contains Sn oxide or is a Sn oxide layer has been mainly described. In the cation exchange reaction, not only $Sn^{4+}$ but also various metal cations such as $In^{3+}$, $Ge^{4+}$, $Ga^{3+}$, $Cd^{2+}$, $Cu^{2+}$, $Ag^+$ and $Ti^{4+}$ may be applied. These cations may be suitable for cation exchange with respect to the parent metal oxide layer 20 by appropriately selecting/adjusting conditions such as composition, concentration, temperature, and reaction time of the reaction solution S10. Accordingly, the formed metal oxide layer 25' may include any one of Sn oxide, In oxide, Ge oxide, Ga oxide, Cd oxide, Cu oxide, Ag oxide, and Ti oxide. In this regard, the embodiments of the present invention may enable low-temperature preparation of metal oxide films comprising cations selected from the group consisting of various metal cations. Therefore, the cation exchange reaction of metal oxides may be a versatile strategy to form high-quality metal oxide films used in various electronic and optoelectronic devices. Furthermore, it may be used in the field of advanced electronic devices having metal oxide films as components, such as flexible thin film transistors, solar cells, light emitting diodes, memories, and gas sensors.

Figure 2:
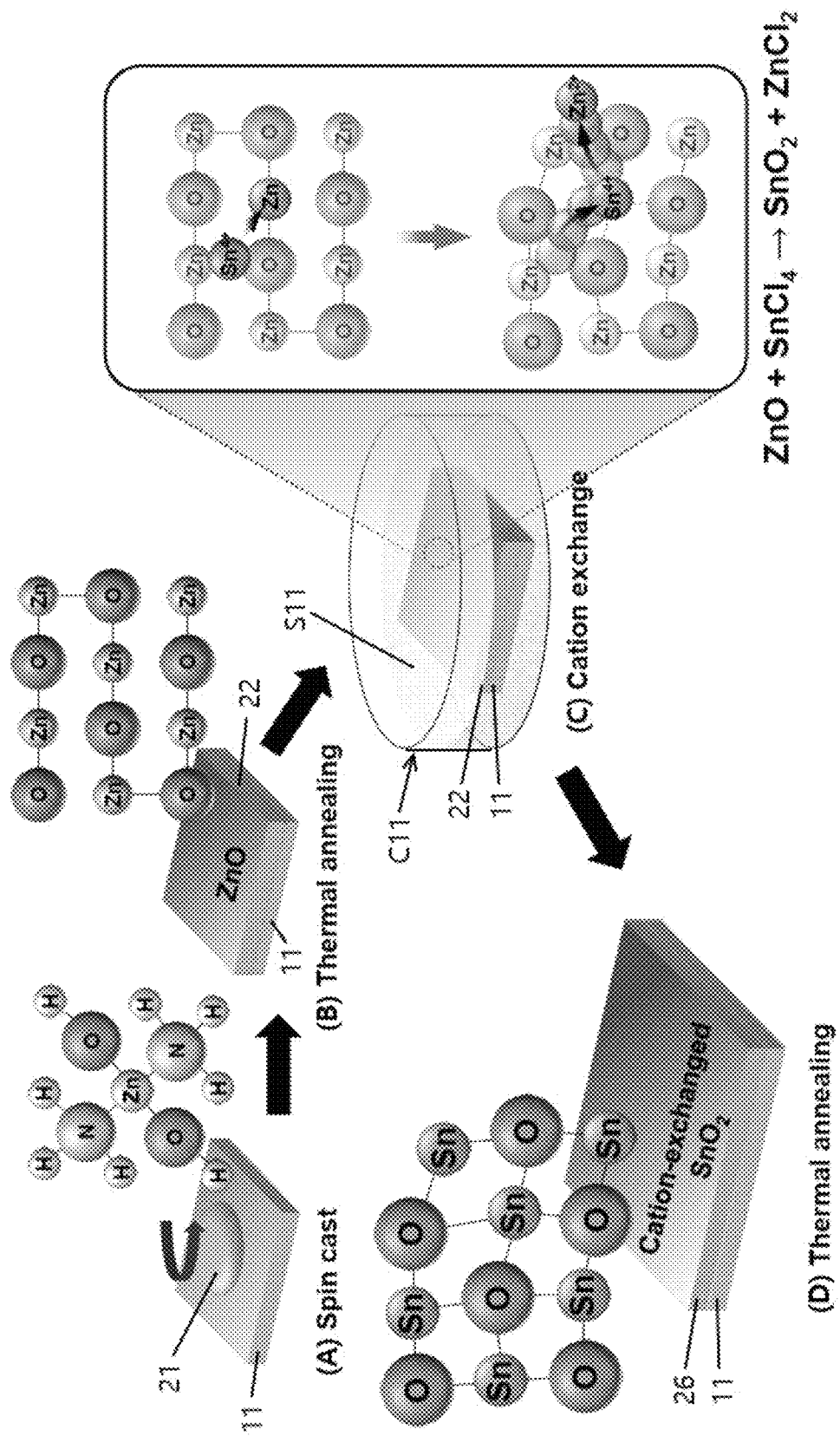
FIG. 2 is a schematic diagram for explaining a method of forming a metal oxide layer according to an exemplary embodiment of the present invention.

FIG. 2 is a schematic diagram for explaining a method of forming a metal oxide layer according to an exemplary embodiment of the present invention. FIG. 2 shows a case where the parent metal oxide layer (20 in FIG. 1A) includes Zn oxide, and the cation-exchanged metal oxide layer (25 in FIG. 1B) includes Sn oxide.

Referring to FIG. 2, in step (A), a coating layer may be formed by coating a ZnO precursor solution 21 on the substrate structure 11, and in step (B), a heat treatment process for the coating layer may be performed on the coating layer to form a parent metal oxide layer 22 containing a Zn oxide. In step (C), a cation exchange reaction may be performed by immersing the parent metal oxide layer 22 in a container C11 containing a reaction solution S11 including cations $Sn^{4+}$. In the cation exchange reaction, exchange between Zn ions ($Zn^{2+}$) of the parent metal oxide layer 22 and Sn ions ($Sn^{4+}$) of the reaction solution S11 may be performed. In step (D), a heat treatment process may be performed on the cation-exchanged metal oxide layer 26. The cation-exchanged metal oxide layer 26 may include Sn oxide.

A specific method according to an embodiment of the present invention is as follows.

<Preparation of ZnO Precursor Solution>

A solution may be prepared by dissolving zinc nitrate hexahydrate [$Zn(NO_3)_2 \cdot 6H_2O$] to a molar concentration of 0.5 M in 15 mL of distilled water. The solution was slowly dropped to 10 mL of a 2.5 M sodium hydroxide (NaOH) aqueous solution, and stirred in air for about 10 minutes. After adding distilled water and repeating the centrifugation process three times to remove $Na^+$ and $NO^{3-}$ from the stirred solution, precipitated zinc hydroxide [$Zn(OH)_2$] may be obtained. For example, a $Zn(NH_3)_x(OH)_y$ solution may be prepared by dissolving 0.7 g of $Zn(OH)_2$ in 25 mL of 6.6 M ammonium hydroxide ($NH_4OH$) at 4° C. for 2 days.

<Formation of a Parent Metal Oxide Layer>

The substrate on which the FTO is formed may be sequentially cleaned by using distilled water, acetone, and isopropyl alcohol, each for 10 minutes. Then, after removing the solvent by heating the substrate on which the FTO is formed in a vacuum oven preheated to 150° C. for 30 minutes, the surface may be treated with a UV ozone cleaner for 30 minutes. A $Zn(NH_3)_x(OH)_y$ solution filtered through a poly(tetrafluoroethylene) syringe filter having a pore size of 0.45 μm may be applied on the substrate, and spin-coated at 1500 rpm for 50 seconds, and then the coated layer may be thermally treated at 250° C. for 1 hour to form a ZnO layer.

<Formation of Cation-Exchanged Metal Oxide Layer>

A reaction solution containing the cation $Sn^{4+}$ may be prepared by dissolving 30 μL of tin(IV) chloride ($SnCl_4$) in ethanol with water added, inside a glove box under an N2 atmosphere. Here, the total amount of ethanol and water may be 40 mL, and the content of water in the total amount of ethanol and water may be 6 vol %. A cation exchange reaction may be performed by immersing the ZnO layer in the reaction solution at 60° C. in air for 1 minute, and as a result, a cation-exchanged metal oxide layer (i.e., $SnO_2$ layer) may be obtained. Then, after rinsing the cation-exchanged metal oxide layer ($SnO_2$ layer) with ethanol several times, a heat treatment may be performed at 100° C. for 30 minutes.

However, the above-described specific methods and process conditions are merely illustrative, and may be variously changed depending on the case.

Figure 3:
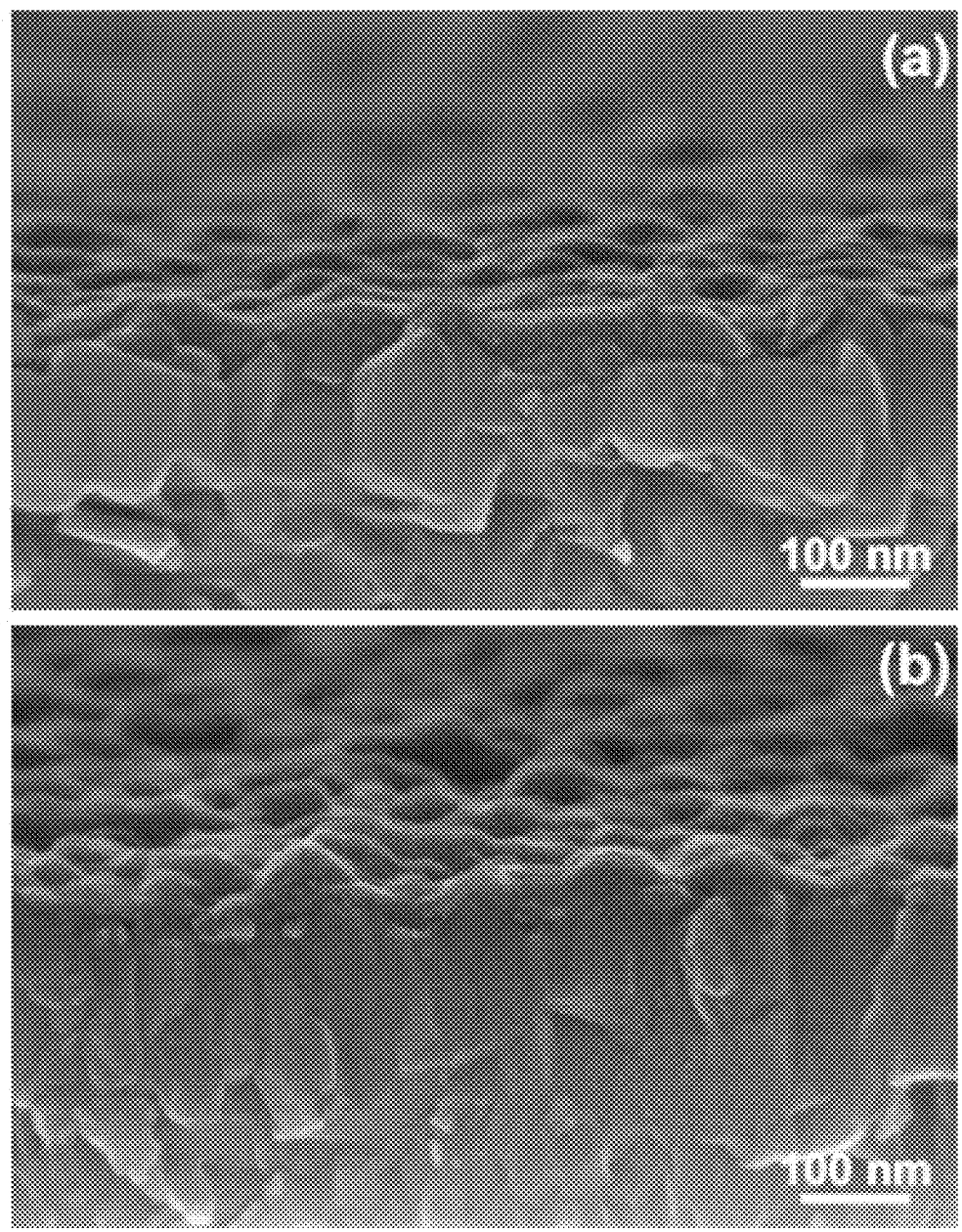
FIG. 3 is a diagram according to an embodiment of the present invention, (a) is a SEM (scanning electron microscopy) image showing a cross section of a parent metal oxide layer (ZnO layer) formed on a glass substrate coated with fluorine-doped tin oxide (FTO), and (b) is a SEM image showing a cross section of the metal oxide layer (ce-$SnO_2$ layer) obtained through cation exchange from the parent metal oxide layer (ZnO layer).

FIG. 3 is an image according to an embodiment of the present invention, (a) is a SEM (scanning electron microscopy) image showing a cross section of a parent metal oxide layer (ZnO layer) formed on a glass substrate coated with fluorine-doped tin oxide (FTO), and (b) is an SEM image showing a cross section of the metal oxide layer ($SnO_2$ layer) obtained through cation exchange from the parent metal oxide layer (ZnO layer). The metal oxide layer ($SnO_2$ layer) has undergone heat treatment and may be referred to as a 'ce-$SnO_2$ layer'.

Referring to FIG. 3, it was confirmed that the parent metal oxide layer (ZnO layer) may have a relatively smooth surface by completely covering the pyramidal FTO domain. In contrast, the metal oxide layer (ce-$SnO_2$ layer) obtained through cation exchange may more clearly reveal the roughness and surface morphology of the FTO domain.

Figure 4:
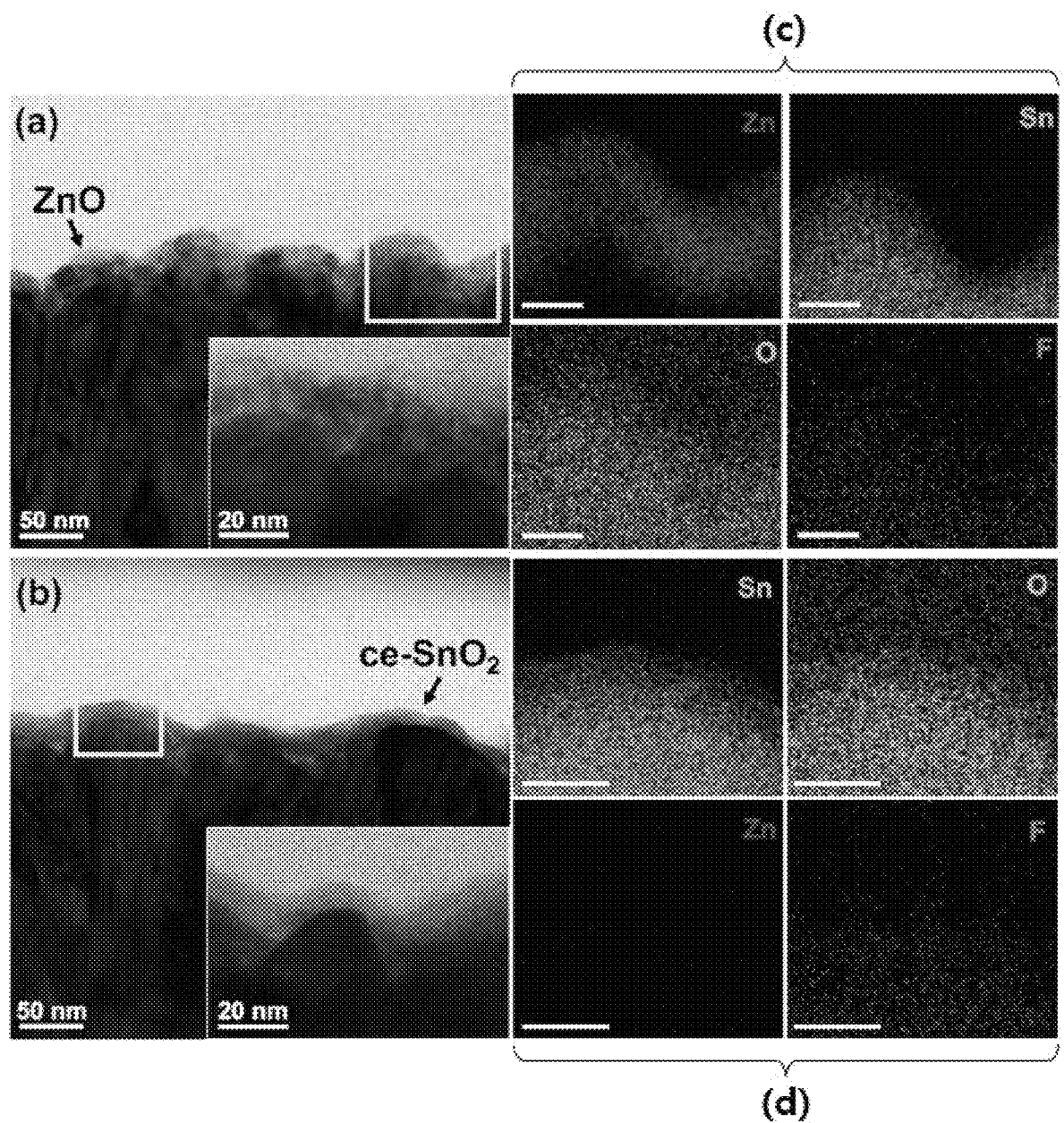
FIG. 4 is a diagram according to an embodiment of the present invention, (a) is a TEM (transmission electron microscopy) image of a parent metal oxide layer (ZnO layer) formed on a glass substrate coated with FTO, and (b) is a TEM image of the metal oxide layer (ce-$SnO_2$ layer) obtained through cation exchange from the parent metal oxide layer (ZnO layer), (c) is an energy dispersive spectroscopy (EDS) map image for the area marked with a white square in (a), and (d) is an EDS map image for the area marked with a white square in (b).

FIG. 4 is a diagram according to an embodiment of the present invention, (a) is a TEM (transmission electron microscopy) image of a parent metal oxide layer (ZnO layer) formed on a glass substrate coated with FTO, and (b) is a TEM image of the metal oxide layer (ce-$SnO_2$ layer) obtained through cation exchange from the parent metal oxide layer (ZnO layer), (c) is an energy dispersive spectroscopy (EDS) map image for the area marked with a white square in (a), and (d) is an EDS map image for the area marked with a white square in (b). The inset images in (a) and (b) are high-magnification images. The scale bars in the EDS map images represent 25 nm.

Referring to FIG. 4, the TEM image of (a) shows that the parent metal oxide layer (ZnO layer) has a thickness of about 20 nm and no visible structural defects. The TEM image of (b) shows that the parent metal oxide layer (ZnO layer) is converted to an amorphous conformal cation-exchanged metal oxide layer (ce-$SnO_2$). In the EDS map of (c), the signals of F atoms and Sn atoms appear due to the FTO material. In the EDS map of (d), the signals for Zn atoms disappeared and signals for Sn atoms additionally appeared along with 0 atoms, which means that all Zn atoms in the parent metal oxide layer (ZnO layer) were exchanged with Sn atoms.

Figure 5:
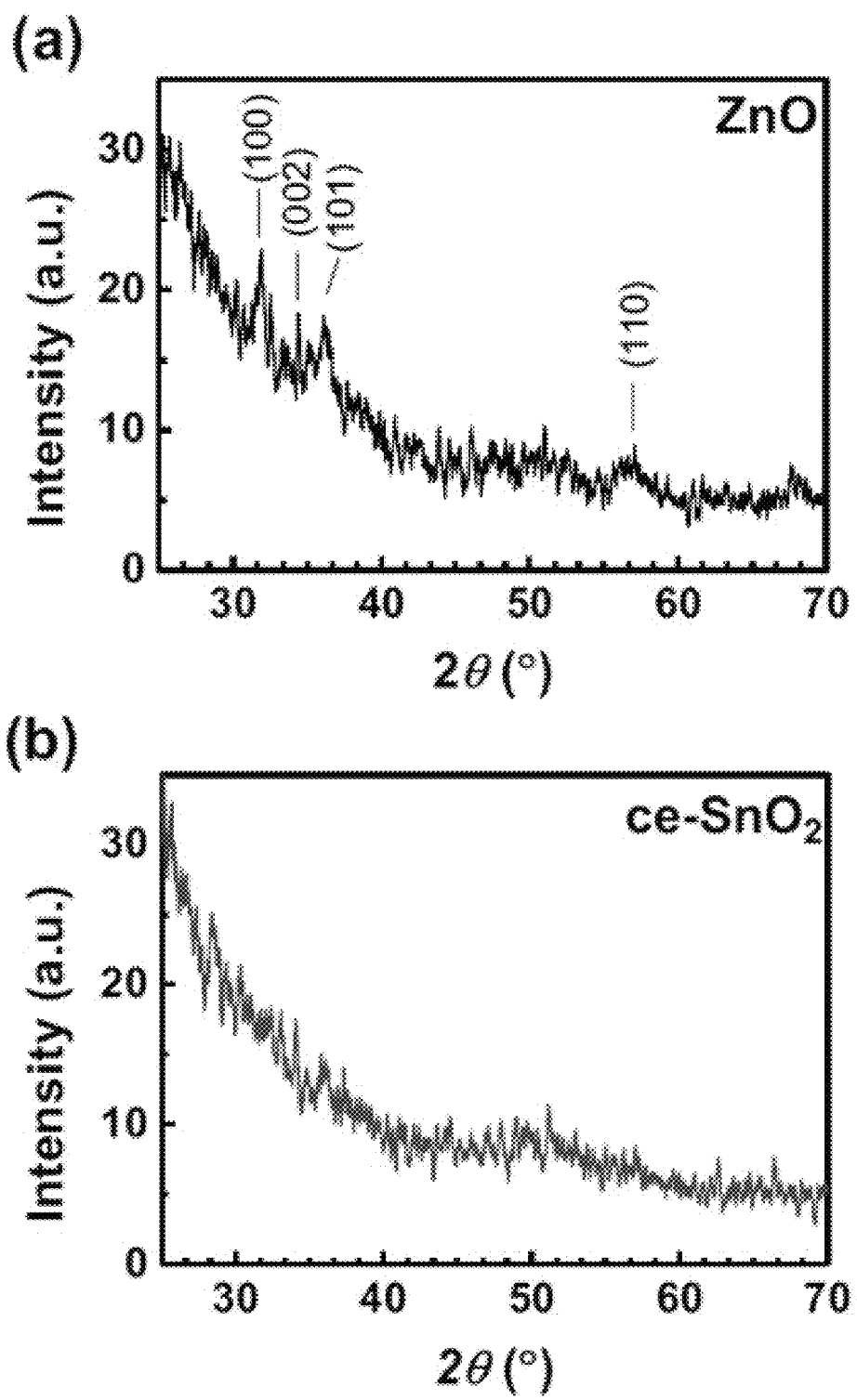
FIG. 5 is a graph according to an embodiment of the present invention, (a) shows an X-ray diffraction (XRD) analysis result of a parent metal oxide layer (ZnO layer), and (b) shows a graph showing XRD analysis results of a metal oxide layer (ce-$SnO_2$ layer) obtained through cation exchange from a parent metal oxide layer (ZnO layer).

FIG. 5 is a graph according to an embodiment of the present invention, (a) shows an X-ray diffraction (XRD) analysis result of a parent metal oxide layer (ZnO layer), and (b) shows a graph showing XRD analysis results of a metal oxide layer (ce-$SnO_2$ layer) obtained through cation exchange from the parent metal oxide layer (ZnO layer). The magnitude average of 9 consecutive data points centered on each 2θ is shown (2θ resolution: 0.02°).

Referring to FIG. 5, it may be confirmed that the parent metal oxide layer (ZnO layer) has a polycrystalline structure, and the cation-exchanged metal oxide layer (ce-$SnO_2$ layer) has an amorphous structure. The parent metal oxide layer (ZnO layer) having a polycrystalline structure was converted into an amorphous metal oxide layer (ce-$SnO_2$ layer).

Figure 6:
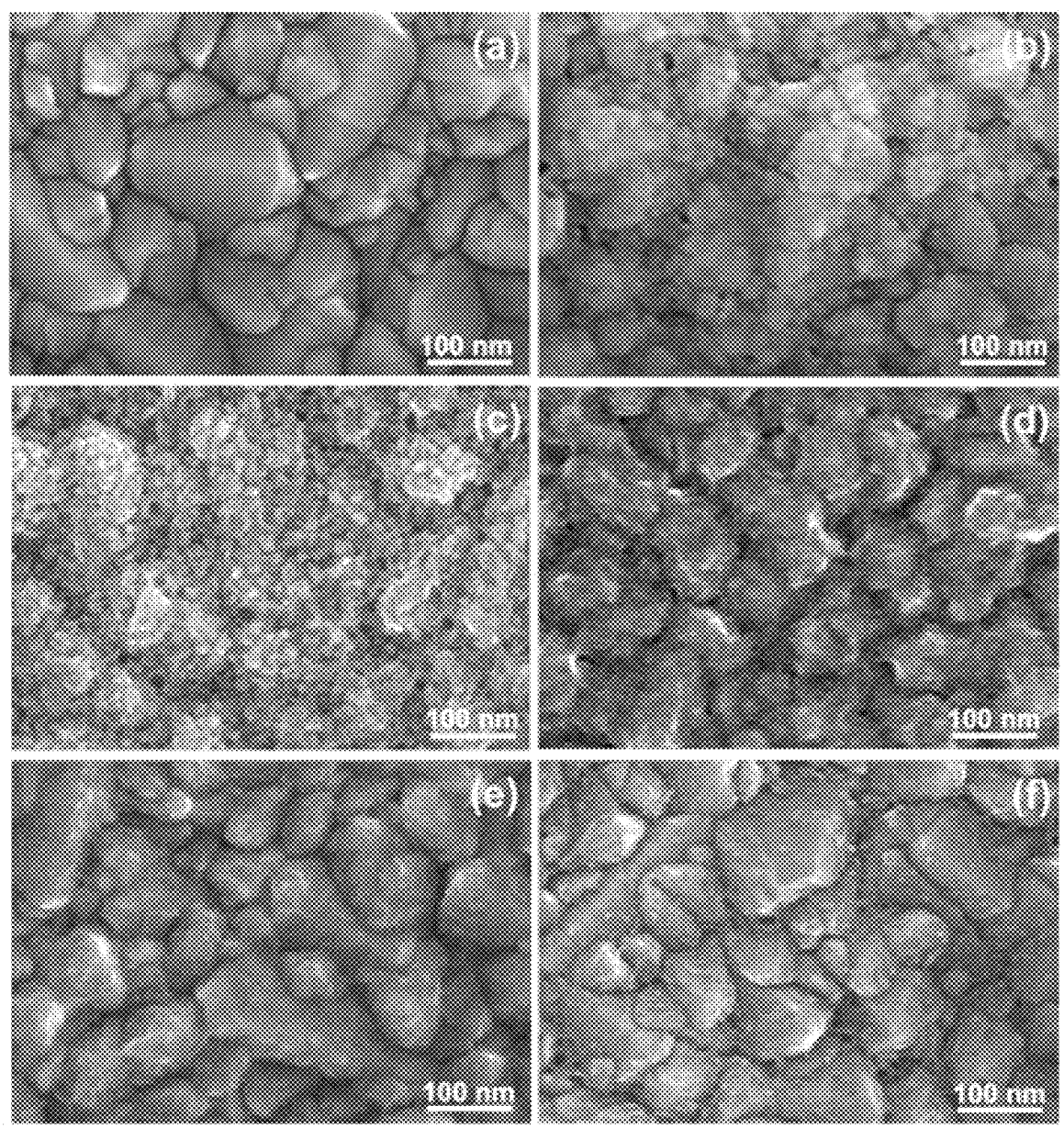
FIG. 6 is images according to an embodiment of the present invention, (a) is an SEM image of the FTO-coated substrate, and (b) is an SEM image of a parent metal oxide layer (ZnO layer) formed on the FTO-coated substrate, and (c) to (f) are SEM images of the metal oxide layer (ce-$SnO_2$ layer) prepared in various ways according to the conditions of the reaction solution.

FIG. 6 is images according to an embodiment of the present invention, (a) is an SEM image of the FTO-coated substrate, and (b) is an SEM image of a parent metal oxide layer (ZnO layer) formed on the FTO-coated substrate, and (c) to (f) are SEM images of the metal oxide layer (ce-$SnO_2$ layer) prepared in various ways according to the conditions of the reaction solution. Image (c) represents a case that a reaction solution using pure ethanol as a solvent is used, image (d) represents a case that a reaction solution using a solvent in which 6 vol % of water is added to ethanol is used, image (e) represents a case that a reaction solution using a solvent to which 10 vol % of water was added to ethanol is used, and image (f) represents a case that a reaction solution using a solvent of 15 vol % of water added to ethanol is used. Here, all of the reaction solutions included $SnCl_4$ as a source of $Sn^{4+}$. The cation exchange reaction was performed by immersing the parent metal oxide layer (ZnO layer) in the reaction solution for 1 minute.

Referring to FIG. 6, in order to replace all Zn with Sn before oxygen anions are solvated in the cation exchange reaction, it is preferable that the diffusion rates of $Sn^{4+}$ and $Zn^{2+}$ become similar to each other by increasing the solvation of $Zn^{2+}$. For this purpose, the polarity of the reaction solution may be increased. The polarity may be increased by adding an appropriate amount of water to ethanol. For example, the polarity of the reaction solution may be increased by adding 6 vol % of water to ethanol, and as a result, a $SnO_2$ layer in which Zn is completely exchanged for Sn may be obtained within 1 minute without significant material loss [image (d)]. On the other hand, when the amount of water is increased to 10 vol %, the solvation of $Zn^{2+}$ is facilitated as the polarity of the reaction solution is greatly increased, and thus, a $SnO_2$ layer which does not completely cover the FTO surface and has somewhat poor connectivity may be obtained [image (e)]. When the proportion of water is further increased to 15 vol %, the parent ZnO layer may be completely or mostly solvated [image (f)]. Conversely, when pure ethanol is used as a solvent, a film having a morphology similar to that of the parent ZnO layer [image (b)] may be formed [image (c)]. In this case, it may not be easy to completely convert a polycrystalline ZnO layer into an amorphous $SnO_2$ layer because the solvation of $Zn^{2+}$ is slow due to the relatively low polarity of the reaction solution.

Figure 7:
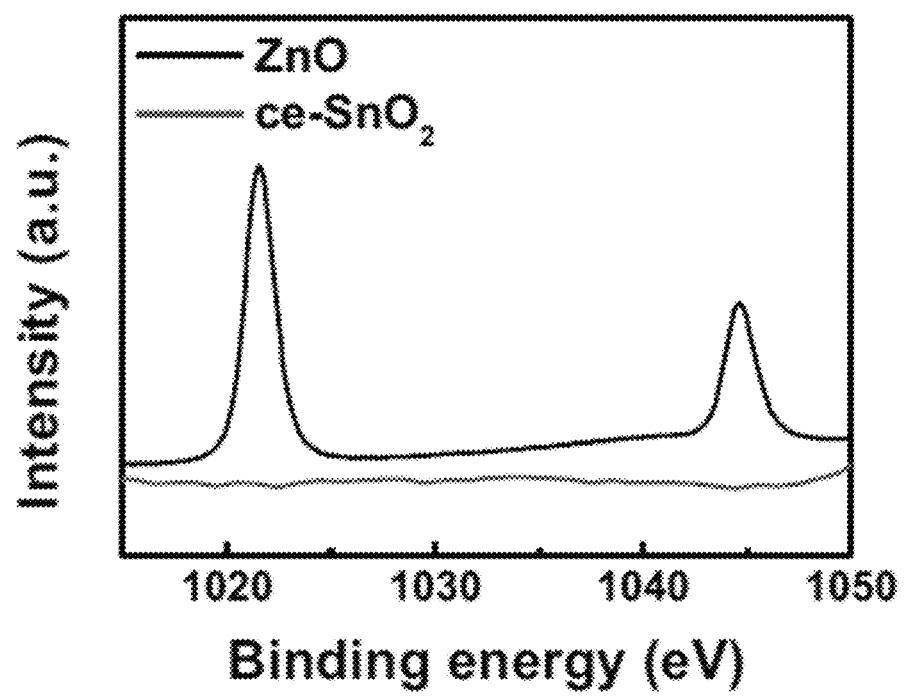
FIG. 7 is a graph according to an embodiment of the present invention, and shows the results of a Zn 2p XPS (X-ray photoelectron spectroscopy) for a parent metal oxide layer (ZnO layer), and a metal oxide layer (ce-$SnO_2$ layer) obtained from the parent metal oxide layer (ZnO layer) through cation exchange.

FIG. 7 is a graph according to an embodiment of the present invention, and shows the results of Zn 2p spectra obtained by XPS (X-ray photoelectron spectroscopy) for a parent metal oxide layer (ZnO layer) and a metal oxide layer (ce-$SnO_2$ layer) from the parent metal oxide layer (ZnO layer) obtained through cation exchange.

Referring to FIG. 7, a peak signal corresponding to Zn 2p was obtained from the parent metal oxide layer (ZnO layer), but it was confirmed that the signal corresponding to Zn 2p completely disappeared for the metal oxide layer (ce-$SnO_2$ layer) obtained through cation exchange. This may mean that Zn atoms are not present in the metal oxide layer (ce-$SnO_2$ layer) obtained through cation exchange.

Figure 8:
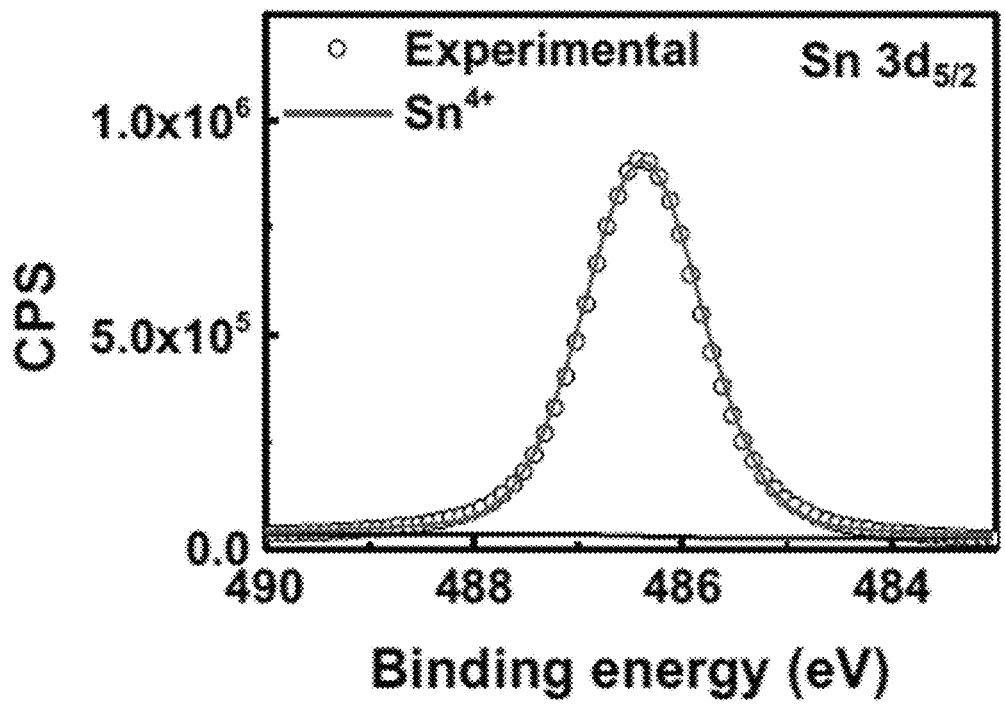
FIG. 8 is a graph showing the results of XPS analysis of Sn $3d_{5/2}$ spectrum of a metal oxide layer (ce-$SnO_2$ layer) obtained through cation exchange according to an embodiment of the present invention.

FIG. 8 is a graph showing the results of XPS analysis of Sn $3d_{5/2}$ spectrum of a metal oxide layer (ce-$SnO_2$ layer) obtained through cation exchange according to an embodiment of the present invention. In FIG. 8, open circles and solid lines are the measured values and their curve fitting results, respectively, and solid lines located below the curve are Shirley backgrounds. Curve fitting was performed with the Gaussian-Lorentzian multiplication function. In FIG. 8, CPS on the Y axis represents count per second.

Referring to FIG. 8, it may be confirmed by curve fitting that the Sn $3d_{5/2}$ peak is composed of a single component with a binding energy of 486.4 eV, which indicates that the oxidation state of Sn in the ce-$SnO_2$ layer prepared according to the example is +4.

Figure 9:
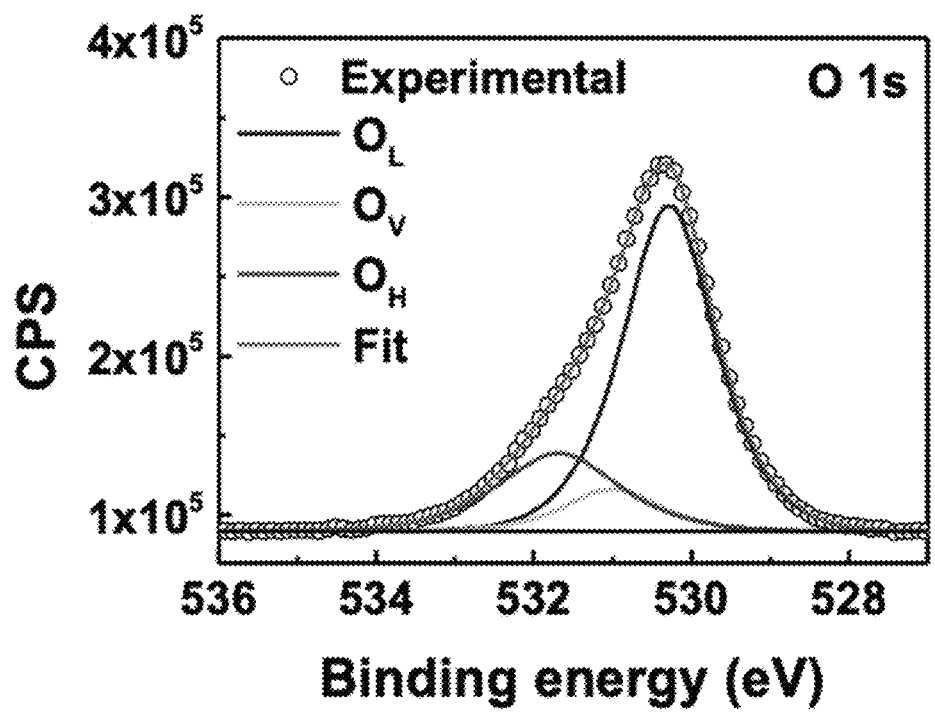
FIG. 9 is a graph showing O 1s XPS analysis results for a metal oxide layer (ce-$SnO_2$ layer) obtained through cation exchange according to an embodiment of the present invention.

FIG. 9 is a graph showing O 1s XPS analysis results for a metal oxide layer (ce-$SnO_2$ layer) obtained through cation exchange according to an embodiment of the present invention. In FIG. 9, the peaks with binding energies of 530.3, 531.0, and 531.7 eV are generated due to oxygen atoms in the metal-oxygen-metal network ($O_L$), oxygen atoms adjacent to oxygen vacancy ($O_V$), and oxygen atoms of —OH species adsorbed on the oxide surface ($O_H$), respectively. In FIG. 9, CPS on the Y axis represents count per second.

Referring to FIG. 9, the O 1s XPS spectrum of the ce-$SnO_2$ layer may be decomposed into three peaks. The contribution $[O_V/(O_L+O_V+O_H)]$ of a signal due to $O_V$ in the O 1s XPS signal of the ce-$SnO_2$ layer is only 9%, which is the lowest among $SnO_2$ films fabricated at 100° C. or less. When a $SnO_2$ film with a high oxygen vacancy fraction is used as an electron transport layer ETL, the charge recombination rate at the ETL/photoactive layer interface is increased, and electron transport is limited due to many charge traps. This may cause a decrease in the fill factor and open-circuit voltage of a device (a solar cell). Therefore, as in the embodiment of the present invention, it may be desirable that the magnitude of the signal due to $O_V$ is small.

Figure 10:
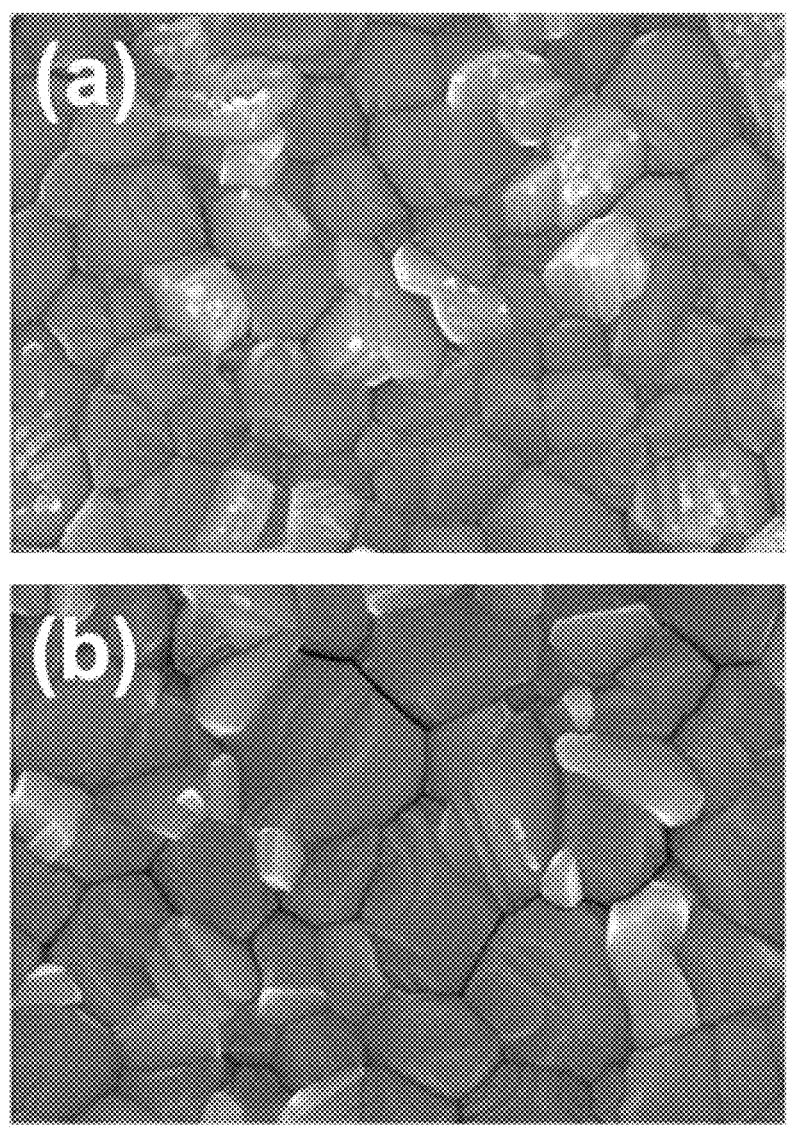
FIG. 10 is SEM images, (a) shows an SEM image of a perovskite film formed on an np-SnO$_2$ layer formed through spin coating of water-soluble colloidal SnO$_2$ nanoparticles according to a comparative example, and (b) shows an SEM image of a perovskite film formed on a ce-SnO$_2$ layer obtained through cation exchange according to an embodiment of the present invention.

FIG. 10 is SEM images, (a) shows an SEM image of a perovskite film formed on an np-$SnO_2$ layer formed through spin coating of water-soluble colloidal $SnO_2$ nanoparticles according to a comparative example, and (b) shows an SEM image of a perovskite film formed on a ce-$SnO_2$ layer obtained through cation exchange according to an embodiment of the present invention.

The np-$SnO_2$ layer was formed by spin-coating water-diluted $SnO_2$ nanoparticles (i.e., np-$SnO_2$) on FTO at 4000 rpm for 40 seconds, followed by heat treatment at 150° C. Here, the ratio of the $SnO_2$ nanoparticles to water (np-$SnO_2$:$H_2O$) was 1 vol %:2 vol %. In images (a) and (b), the perovskite films are formed under the same process condition.

Figure 11:
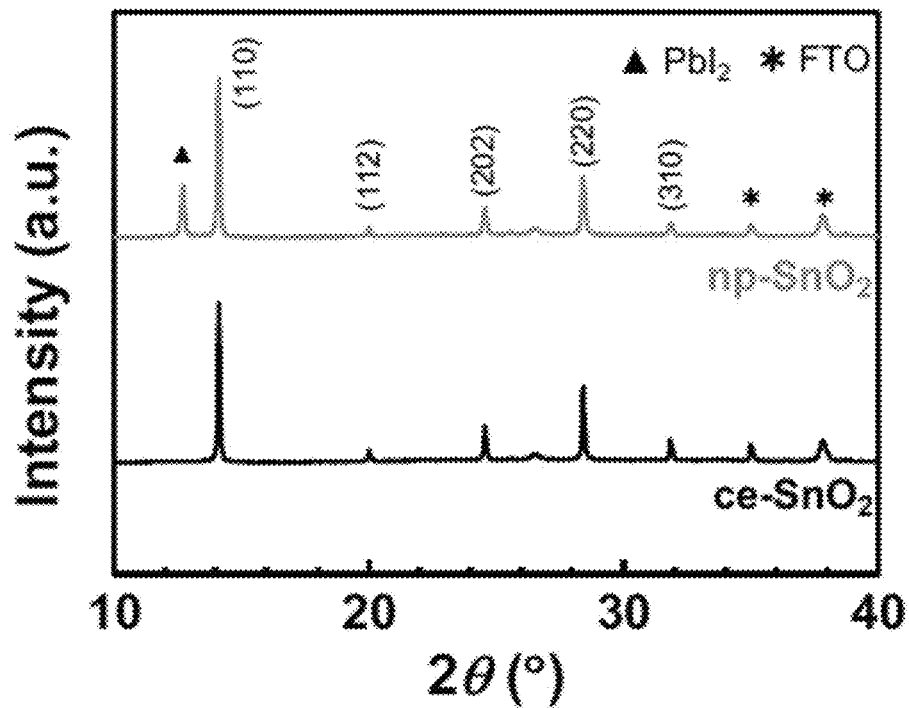
FIG. 11 is a graph showing XRD analysis results for each of the perovskite film formed on the ce-SnO$_2$ layer and the perovskite film formed on the np-SnO$_2$ layer of FIG. 10.

FIG. 11 is a graph showing XRD analysis results for both the perovskite film formed on the ce-$SnO_2$ layer and the perovskite film formed on the np-$SnO_2$ layer shown in FIG. 10.

Referring to FIG. 10 and FIG. 11, the perovskite film formed on the ce-$SnO_2$ layer according to the embodiment has diffraction peaks corresponding to the tetragonal perovskite phase without peak shift or new peak, which means that the ce-$SnO_2$ layer does not impede the crystal growth of the perovskite. In fact, the SEM image of the perovskite film deposited on the ce-$SnO_2$ layer shows that a compact perovskite film having a large grain size without pinholes was grown on the ce-$SnO_2$ layer. In contrast, in the XRD analysis of the perovskite film deposited on the np-SnO$_2$ layer, there is a diffraction peak at 12.6° assigned to the (001) lattice plane of hexagonal lead(II) iodide (PbI$_2$), which may be interpreted that the growth of the perovskite film was hindered due to the organic surfactant and O$_H$— groups remaining in the np-SnO$_2$ layer.

Figure 12:
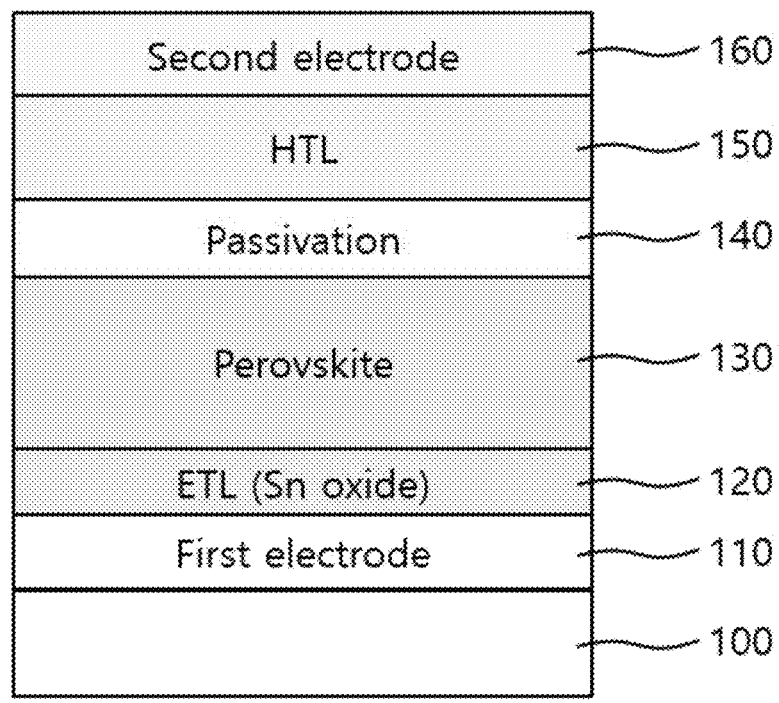
FIG. 12 is a cross-sectional view illustrating a method of manufacturing a perovskite solar cell PSC by applying a method of forming a metal oxide layer according to an embodiment of the present invention and a result thereof.

FIG. 12 is a cross-sectional view illustrating a method of manufacturing a perovskite solar cell PSC by applying a method of forming a metal oxide layer according to an embodiment of the present invention and a result thereof.

Referring to FIG. 12, a method of manufacturing a perovskite solar cell (PSC) according to an embodiment of the present invention may include preparing a first electrode 110. A first electrode 110 may be formed on the substrate 100. The substrate 100 may be, for example, a transparent substrate such as a glass substrate. The first electrode 110 may include transparent conductive oxide TCO. For example, the first electrode 110 may be fluorine-doped tin oxide (FTO). The FTO may be an example of a transparent electrode material. However, the constituent materials of the substrate 100 and the first electrode 110 are not limited to those described above and may be variously changed.

The manufacturing method of the perovskite solar cell PSC may include forming an electron transport layer ETL 120 including a metal oxide layer on the first electrode 110. The electron transport layer ETL 120 may be formed by using the method for forming a metal oxide layer according to the embodiments described with reference to FIGS. 1A to 1D and FIG. 2. In this embodiment, the electron transport layer ETL 120 may include Sn oxide or may be a Sn oxide layer. This electron transport layer ETL 120 may be referred to as a 'ce-SnO$_2$ layer'. The thickness of the electron transport layer ETL 120 may be, for example, about 5 to 50 nm or about 5 to 30 nm.

The manufacturing method of the perovskite solar cell PSC may include forming an electron transport layer ETL 120, forming a perovskite-based photoactive layer 130, forming a hole transport layer HTL 150 on the photoactive layer 130, and forming a second electrode 160 on the hole transport layer HTL 150. In addition, the manufacturing method of the perovskite solar cell PSC may further include forming a passivation layer 140 on the perovskite photoactive layer 130. In this case, a hole transport layer HTL 150 may be formed on the passivation layer 140. The passivation layer 140 is a layer which protects the perovskite-based photoactive layer 130 and may serve to passivate the perovskite-based photoactive layer 130.

According to a specific example, the perovskite-based photoactive layer 130 may have a composition of Cs$_{0.05}$(FA$_{0.83}$MA$_{0.17}$)$_{0.95}$Pb (I$_{0.95}$Br$_{0.05}$)$_3$. Here, FA represents formamidinium and MA represents methylammonium. The passivation layer 140 may be formed of phenethylammonium iodide (PEAI). The hole transport layer HTL 150 may be formed of spiro-OMeTAD. Here, the spiro-OMeTAD is 2,2',7,7'-tetrakis(N,N-di-p-methoxyphenylamine)-9,9spirobifluorene. The second electrode 160 may be formed of Au. Accordingly, the perovskite solar cell PSC may have a structure of FTO/SnO$_2$/perovskite/PEAI/spiro-OMeTAD/Au. In this configuration, the thickness of the perovskite-based photoactive layer 130 may be 400 to 800 nm, specifically, 600 nm, the thickness of the passivation layer 140 may be 0.5 to 3 nm, specifically, 1 nm, the thickness of the hole transport layer HTL 150 may be 100 to 200 nm, specifically, 150 nm, and the thickness of the second electrode 160 may be 5 to 20 nm, specifically, 100 nm. However, specific materials and thicknesses of the constituent layers of the perovskite solar cell PSC may vary. All of the perovskite-based materials, the hole transport layer materials, the electrode materials, passivation layer materials, and the like which are commonly used may be used.

A specific manufacturing method of a perovskite solar cell PSC according to an embodiment of the present invention is as follows.

<Manufacturing of PSC>

The substrate on which the FTO is formed may be sequentially cleaned by using distilled water, acetone, and isopropyl alcohol, with each step lasting 10 minutes. Afterward, any remaining solvent may be removed by heating the substrate in a vacuum oven preheated to 150° C. for 30 minutes. The surface can then be treated with a UV ozone cleaner for an additional 30 minutes. A Zn(NH$_3$)$_x$(O$_H$)$_y$ solution, filtered through a poly(tetrafluoroethylene) syringe filter having a pore size of 0.45 μm is applied on the substrate. It is then spin-coated at 1500 rpm for 50 seconds. Subsequently a ZnO layer may be formed by heat-treating the coated layer at 250° C. for 1 hour. An electron transport layer ETL including Sn oxide may be formed by using the ZnO layer as a parent metal oxide layer through a cation exchange reaction and heat treatment process. Specific conditions for the cation exchange reaction and heat treatment process may be the same as described above.

Then, the perovskite precursor solution, filtered through a poly(tetrafluoroethylene) syringe filter having a pore size of 0.45 μm, was dropped on the electron transport layer ETL. The perovskite film may be deposited by spin coating the dropped perovskite precursor solution for 10 seconds at 3000 rpm, followed by 20 seconds at 5000 rpm. Approximately 10 seconds before the completion of the spin coating, chlorobenzene, used as an anti-solvent, may be dropped. The resulting perovskite film may be heat treated at 100° C. for 30 minutes. The perovskite film thus prepared serves as a perovskite-based photoactive layer. Next, a passivation layer may be formed by spin coating the PEAI solution at 5000 rpm for 40 seconds, and then a hole transport layer HTL may be formed by spin coating the spiro-OMeTAD solution at 3000 rpm for 30 seconds. Finally, an Au electrode (a second electrode) with a thickness of 100 nm may be thermally deposited through a shadow mask in vacuum (approximately $10^{-7}$ Torr).

However, the above-described specific methods and process conditions are merely illustrative, and may be variously changed depending on the case.

Meanwhile, in the manufacturing processes of the perovskite solar cell PSC according to the comparative example, an electron transport layer ETL composed of an np-SnO$_2$ layer may be applied instead of the electron transport layer ETL composed of a ce-SnO$_2$ layer. The np-SnO$_2$ layer may be formed by spin-coating water-diluted SnO$_2$ nanoparticles (i.e., np-SnO$_2$) on the FTO at 4000 rpm for 40 seconds and performing heat treatment at 150° C. Here, the ratio of the SnO$_2$ nanoparticles to water (np-SnO$_2$:H$_2$O) may be 1 vol %:2 vol %. Other manufacturing processes may be the same as the manufacturing method of the perovskite solar cell PSC according to the embodiment.

Figure 13:
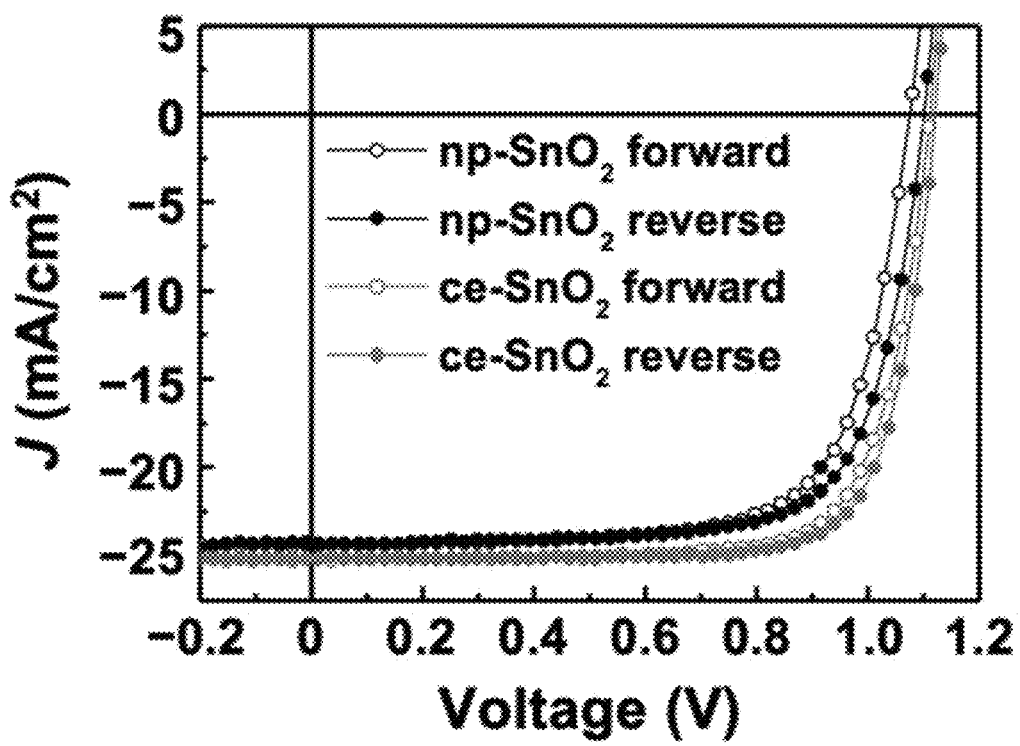
FIG. 13 is a graph showing current density versus voltage (J-V) characteristics measured by forward and reverse scans of each of a perovskite solar cell PSC including an electron transport layer ETL composed of a ce-SnO$_2$ layer according to an embodiment of the present invention, and a perovskite solar cell PSC including an electron transport layer ETL composed of a np-SnO$_2$ layer according to a comparative example.

FIG. 13 is a graph showing current density versus voltage (J-V) characteristics measured by forward and reverse scans of two distinct perovskite solar cells PSCs. One PSC features an electron transport layer ETL composed of a ce-SnO$_2$ layer, according to an embodiment of the present invention. The other PSC uses an ETL composed of a np-SnO$_2$ layer according to a comparative example.

Referring to FIG. 13, it may be confirmed that a perovskite solar cell PSC including an electron transport layer ETL composed of a ce-SnO$_2$ layer according to an embodiment of the present invention shows better performance than that of a perovskite solar cell PSC including an electron transport layer ETL composed of a np-$SnO_2$ layer according to a comparative example. The perovskite solar cell PSC utilizing the np-$SnO_2$ ETL has a power-conversion efficiency PCE of 19.69% together with a short-circuit current density ($J_{SC}$) of 24.23 mA/$cm^2$, an open-circuit voltage ($V_{OC}$) of 1.10 V and a fill factor (FF) of 0.74. In comparison, the perovskite solar cell PSC using ce-$SnO_2$ ETL showed a small hysteresis index of 1.56, a $J_{SC}$ of 25.08 mA/cm2, a $V_{OC}$ of 1.12 V, and a FF of 0.78, which leads to a high PCE of 22%. The obtained PCE value may be the highest among $SnO_2$ ETL-based perovskite solar cells (PSCs) manufactured at a process temperature of 100° C. or less.

Figure 14:
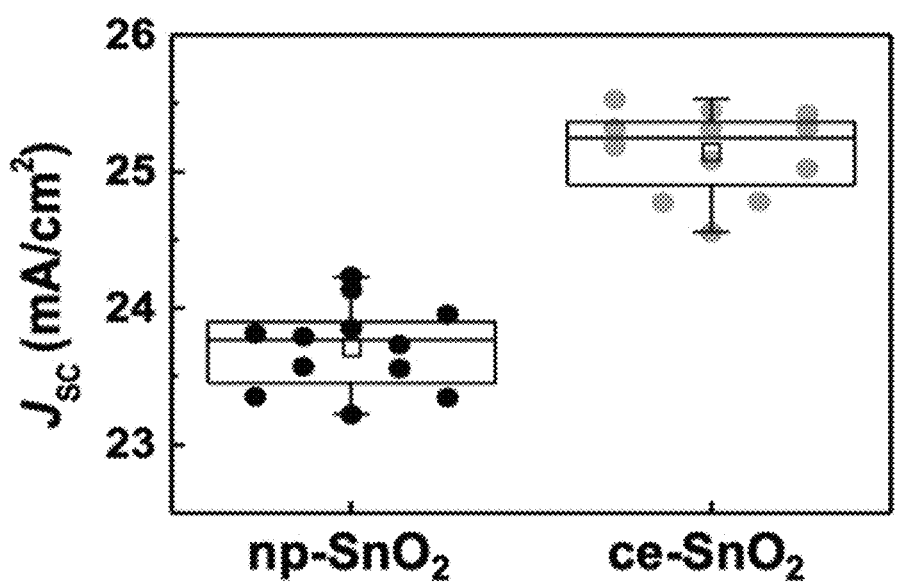
FIG. 14 is a graph indicating a short circuit current density (J$_{SC}$) as a box-whisker for 12 perovskite solar cells (PSCs) including an electron transport layer ETL composed of a ce-SnO$_2$ layer according to an embodiment of the present invention, and 12 perovskite solar cells (PSCs) including an electron transport layer ETL composed of a np-SnO$_2$ layer according to a comparative example.

FIG. 14 is a box-whisker statistical distribution plot showing the short circuit current density ($J_{SC}$) of 12 perovskite solar cells (PSCs) with an electron transport layer ETL composed of a ce-$SnO_2$ layer according to an embodiment of the present invention, and 12 perovskite solar cells (PSCs) with an electron transport layer ETL composed of a np-$SnO_2$ layer according to a comparative example.

Figure 15:
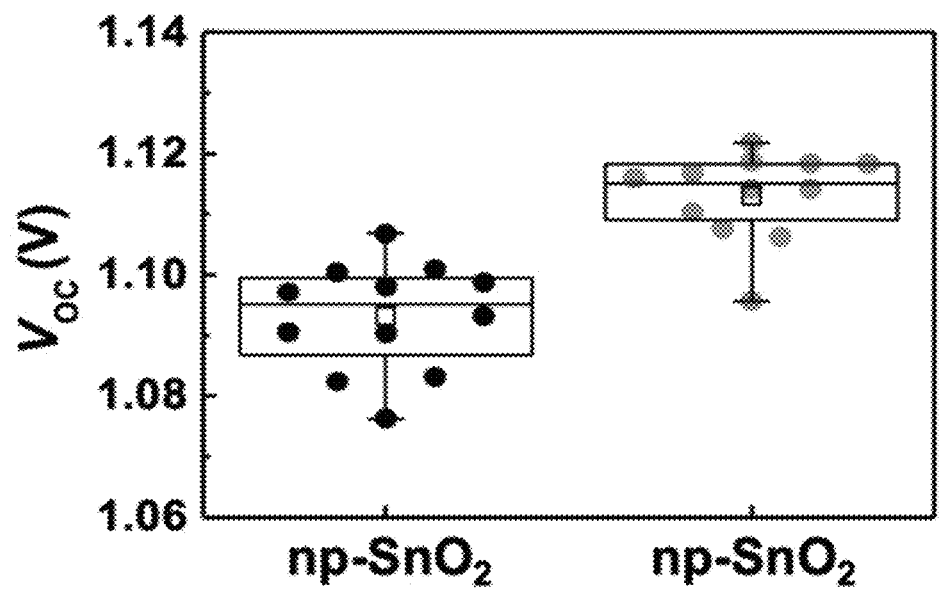
FIG. 15 is a graph indicating an open voltage (V$_{OC}$) as a box-whisker for 12 perovskite solar cells (PSCs) including an electron transport layer ETL composed of a ce-SnO$_2$ layer according to an embodiment of the present invention, and 12 perovskite solar cells (PSCs) including an electron transport layer ETL composed of a np-SnO$_2$ layer according to a comparative example.

FIG. 15 is a box-whisker distribution plot showing the open-circuit voltage ($V_{OC}$) of 12 perovskite solar cells (PSCs) with an electron transport layer ETL composed of a ce-$SnO_2$ layer according to an embodiment of the present invention, and 12 perovskite solar cells (PSCs) with an electron transport layer ETL composed of a np-$SnO_2$ layer according to a comparative example.

Figure 16:
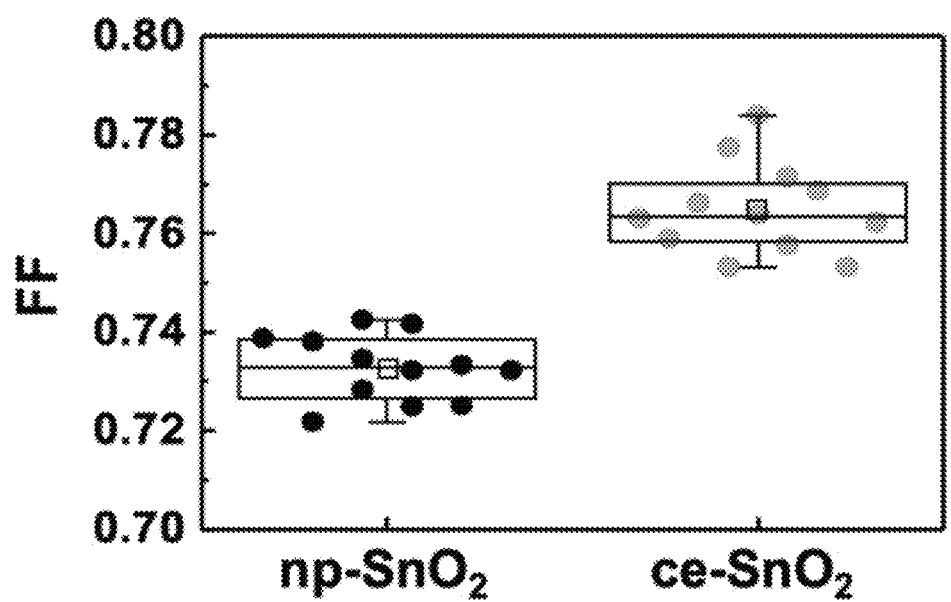
FIG. 16 is a graph indicating a fill factor (FF) as a box-whisker for 12 perovskite solar cells (PSCs) including an electron transport layer ETL composed of a ce-SnO$_2$ layer according to an embodiment of the present invention, and 12 perovskite solar cells (PSCs) including an electron transport layer ETL composed of a np-SnO$_2$ layer according to a comparative example.

FIG. 16 is a box-whisker distribution plot showing the fill factor (FF) of 12 perovskite solar cells (PSCs) with an electron transport layer ETL composed of a ce-$SnO_2$ layer according to an embodiment of the present invention, and 12 perovskite solar cells (PSCs) with an electron transport layer ETL composed of a np-$SnO_2$ layer according to a comparative example.

Figure 17:
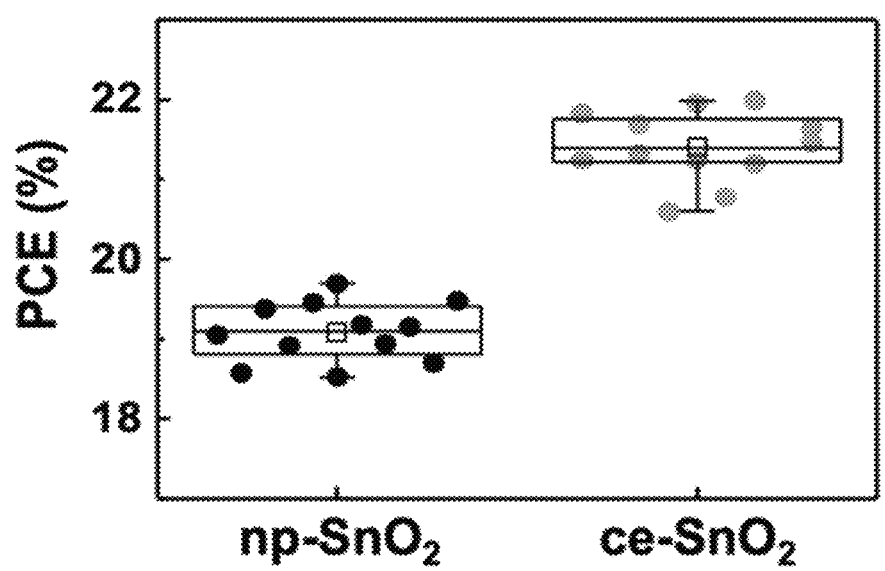
FIG. 17 is a graph indicating PCE (power-conversion efficiency) as a box-whisker for 12 perovskite solar cells (PSCs) including an electron transport layer ETL composed of a ce-SnO$_2$ layer according to an embodiment of the present invention, and 12 perovskite solar cells (PSCs) including an electron transport layer ETL composed of a np-SnO$_2$ layer according to a comparative example.

FIG. 17 is a box-whisker distribution plot showing the power-conversion efficiency (PCE) of 12 perovskite solar cells (PSCs) with an electron transport layer ETL composed of a ce-$SnO_2$ layer according to an embodiment of the present invention, and 12 perovskite solar cells (PSCs) with an electron transport layer ETL composed of a np-$SnO_2$ layer according to a comparative example. In FIG. 14 through FIG. 17, the upper and lower edges of each box represent the upper and lower quartiles, respectively. The middle line within the box indicates the median value, the whiskers denote the maximum and minimum values, and the square symbol corresponds to the average value.

Referring to FIG. 14 through FIG. 17, in all performance indicators, it may be confirmed that the perovskite solar cell PSC with the electron transport layer ETL composed of the ce-$SnO_2$ layer according to the embodiment outperforms the perovskite solar cell PSC with the electron transport layer ETL composed of np-$SnO_2$ layer according to the comparative example.

Additionally, the method of forming a metal oxide layer using a cation exchange technique according to an embodiment of the present invention may be effectively applied to the manufacture of not only perovskite solar cells (PSCs) but also other devices. In this regard, a method of manufacturing a device according to an embodiment of the present invention may include forming a metal oxide layer using the above-described method using a cation exchange technique, and forming at least one electrode structure electrically connected to the metal oxide layer.

According to the embodiments described above, the present invention provides a method that uses cation exchange technique to form a high-quality metal oxide layer at a relatively low process temperature. In addition, a perovskite solar cell PSC having excellent performance may be easily manufactured by applying the method of forming the metal oxide layer described above.

For example, when using the cation exchange technique according to an embodiment of the present invention, through a process of heat treatment at a low temperature of about 80 to 200° C. (e.g., about 100° C.) for about 20 minutes or more or about 30 minutes or more, it is possible to form a Sn oxide layer ($SnO_2$ layer) having a very low oxygen vacancy ratio, which is difficult to achieve by conventional $SnO_2$ film manufacturing methods. In an embodiment of the present invention, the film (oxide layer) immediately after the cation exchange process may be in a state in which ionic impurities including tin hydroxide are minimized, which enables a high-quality Sn oxide layer ($SnO_2$ layer) to be formed at a significantly lower temperature than conventional manufacturing methods. In addition, conventional manufacturing methods usually deposit a $SnO_2$ film with a thickness of 30 to 50 nm to completely cover the rough surface of the underlying FTO (fluorine-doped tin oxide) transparent electrode. On the other hand, when the cation exchange technique according to the embodiment of the present invention is used, a Sn oxide layer ($SnO_2$ layer) of a thickness of about 5 to 30 nm (e.g., about 10 nm) having a conformal surface coverage on the FTO surface may be deposited. This means that the power-conversion efficiency may be improved by increasing the short-circuit current density and fill factor of PSC through extracting electrons more effectively than conventional manufacturing methods. In fact, in the embodiment of the present invention, the performance of the PSC using the Sn oxide layer ($SnO_2$ layer) deposited by the cation exchange technique as the ETL was superior to the PSC with the ETL made of colloidal $SnO_2$ nanoparticles.

According to an embodiment of the present invention, it is possible to easily manufacture a high-efficiency flexible PSC at a low temperature by overcoming the limitations of the manufacturing process of the Sn oxide layer, which is a key material for the PSC. Furthermore, the embodiments of the present invention may impart industrial scalability to metal oxide films which are core materials for advanced electronic devices. In particular, cation exchange may be a useful technique in terms of development of advanced devices based on metal oxide films, performance improvement of existing devices, reduction in manufacturing cost, and mass productivity, and is expected to contribute to the development of the advanced electronic device industry.

The metal oxide layer formed according to an embodiment of the present invention may include, for example, any one of Sn oxide, In oxide, Ge oxide, Ga oxide, Cd oxide, Cu oxide, Ag oxide, and Ti oxide. Therefore, the cation exchange reaction of metal oxide according to the embodiment may be a versatile strategy for forming high-quality metal oxide films used in various electronic and optoelectronic devices, and it may be used in the field of advanced electronic devices having a metal oxide film as a constituent layer such as flexible thin film transistors, solar cells, light emitting diodes, memories, gas sensors, and the like.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims. The drawings and the forgoing description gave examples of the present inven-

What is claimed is:

1. A method of forming a metal oxide layer comprising:
   forming a parent metal oxide layer on a substrate structure;
   changing the parent metal oxide layer into a cation-exchanged metal oxide layer through a cation exchange reaction between cations in the parent metal oxide layer and cations in a reaction solution by contacting the parent metal oxide layer with the reaction solution; and
   performing a heat treatment process on the cation-exchanged metal oxide layer,
   wherein the parent metal oxide layer includes a first binary metal oxide, and the cation-exchanged metal oxide layer includes a second binary metal oxide different from the first binary metal oxide.

2. The method of forming a metal oxide layer of the claim 1, wherein the parent metal oxide layer includes Zn oxide.

3. The method of forming a metal oxide layer of the claim 1, wherein the cation exchanged metal oxide layer includes Sn oxide.

4. The method of forming a metal oxide layer of the claim 1, wherein the forming the parent metal oxide layer comprising:
   forming a coating layer by coating an ammine-hydroxo zinc complex solution on the substrate structure; and
   performing a heat treatment process on the coating layer.

5. The method of forming a metal oxide layer of the claim 4, wherein the heat treatment process for the coating layer is performed at a temperature of about 100 to 300° C. for about 30 minutes or more.

6. The method of forming a metal oxide layer of the claim 1, wherein the changing of the parent metal oxide layer into the cation exchanged metal oxide layer is performed to exchange about 90% to 100% of metal cations of the parent metal oxide layer with the cations in the reaction solution.

7. The method of forming a metal oxide layer of the claim 1, wherein the reaction solution includes a mixture of $SnCl_4$, ethanol and water.

8. The method of forming a metal oxide layer of the claim 7, wherein the concentration of $SnCl_4$ in the reaction solution is in the range of about 3 to 10 mM.

9. The method of forming a metal oxide layer of the claim 1, wherein the cation exchange reaction is performed by immersing the parent metal oxide layer in the reaction solution, the temperature of the reaction solution is in the range of room temperature to 100° C., and the cation exchange reaction is performed for about 30 seconds to 10 minutes.

10. The method of forming a metal oxide layer of the claim 1, wherein the heat treatment process for the cation-exchanged metal oxide layer is performed for about 20 minutes to 2 hours at a temperature of about 80 to 200° C.

11. The method of forming a metal oxide layer of the claim 1, wherein the substrate structure includes fluorine-doped tin oxide (FTO), and the parent metal oxide layer is formed on a surface of the FTO.

12. A method of manufacturing a perovskite solar cell PSC comprising:
    preparing a first electrode;
    forming an electron transport layer ETL including a metal oxide layer formed by using the method of forming a metal oxide layer described in claim 1 on the first electrode;
    forming a perovskite-based photoactive layer on the electron transport layer ETL;
    forming a hole transport layer HTL on the photoactive layer; and
    forming a second electrode on the hole transport layer HTL.

13. The method of manufacturing a perovskite solar cell PSC of the claim 12, wherein the electron transport layer ETL includes Sn oxide.

14. The method of manufacturing a perovskite solar cell PSC of the claim 13, wherein the electron transport layer ETL has a thickness ranging from about 5 to 50 nm.

15. The method of manufacturing a perovskite solar cell PSC of the claim 13, wherein the first electrode includes fluorine-doped tin oxide (FTO).

16. The method of manufacturing a perovskite solar cell PSC of the claim 13, further comprising forming a passivation layer on the perovskite-based photoactive layer, and wherein the hole transport layer HTL may be formed on the passivation layer.

17. The method of manufacturing a perovskite solar cell PSC of the claim 12, wherein the electron transport layer ETL includes Sn oxide.

18. The method of manufacturing a perovskite solar cell PSC of the claim 12, wherein the first electrode includes fluorine-doped tin oxide (FTO).

19. A method of manufacturing a device comprising:
    forming a metal oxide layer by using the method for forming a metal oxide layer of claim 1; and
    forming at least one electrode structure electrically connected to the metal oxide layer.

* * * * *